United States Patent [19]

Schäty

[11] Patent Number: 4,579,493

[45] Date of Patent: Apr. 1, 1986

[54] PUSH BUTTON FOR CHRISTMAS TREE STUD

[75] Inventor: Harald Schäty, Wetzlar, Fed. Rep. of Germany

[73] Assignee: USM Corporation, Flemington, N.J.

[21] Appl. No.: 524,852

[22] Filed: Aug. 19, 1983

[30] Foreign Application Priority Data

Aug. 27, 1982 [DE] Fed. Rep. of Germany ... 8224277[U]

[51] Int. Cl.$^4$ .............................................. F16B 37/16
[52] U.S. Cl. ................................. 411/510; 411/437; 411/908; 24/104; 24/108; 24/662
[58] Field of Search .................... 411/371–373, 411/516–519, 508–510; 24/104, 106, 108, 662, 671, 90 R; 403/293

[56] References Cited

U.S. PATENT DOCUMENTS

| | | | |
|---|---|---|---|
| 521,776 | 6/1894 | Anderson | 24/108 |
| 878,683 | 2/1908 | Stashko | 24/108 |
| 1,274,787 | 8/1918 | Rowe | 24/108 |
| 3,736,834 | 6/1973 | MacDonald | 411/512 |
| 4,408,372 | 10/1983 | Kimura et al. | 24/662 |

FOREIGN PATENT DOCUMENTS 978724 12/1975 Canada ............................... 24/662

Primary Examiner—Kenneth J. Dorner
Assistant Examiner—Neill Wilson
Attorney, Agent, or Firm—Aubrey C. Brine

[57] ABSTRACT

A push button is provided which is adaptable for pressing onto a stud having redges extending radially therefrom. The push button is provided with at least one resilient finger protruding from the wall of a blind hole formed in the shank of the button. The resilient finger is angularly disposed toward the center of the blind hole such that the end face of the finger is disposed behind a ridge with the push button positioned on a stud. The push button is provided with an opening for each resilient finger, which opening extends from outside the button towards the locality of the end face of the resilient finger and is of a dimension to eclipse, or cover the cross-section of the resilient finger when projected onto the plane of the opening.

2 Claims, 4 Drawing Figures

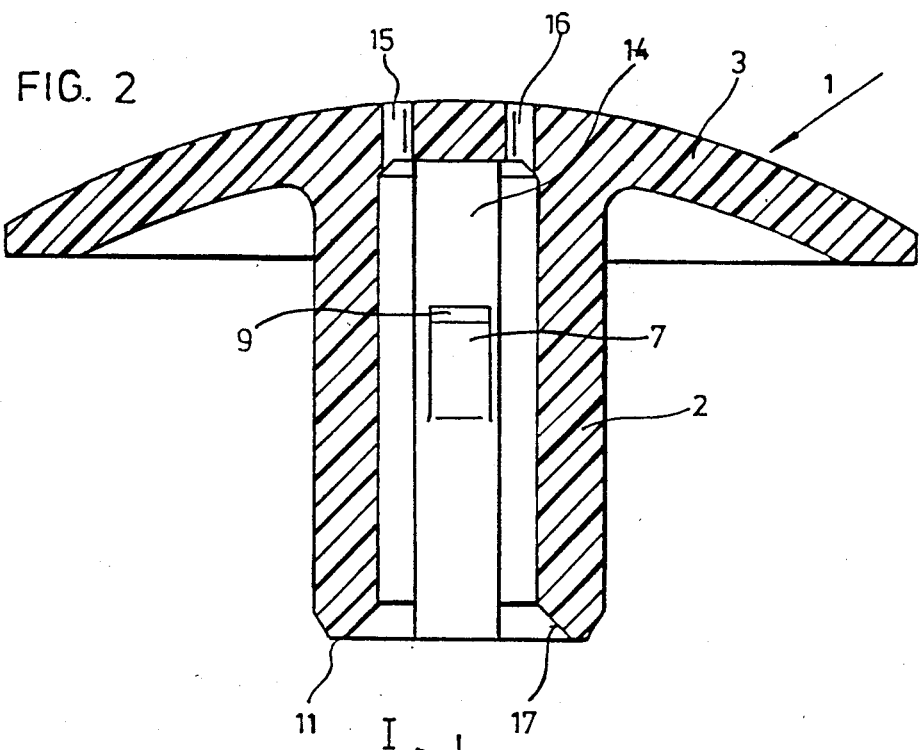
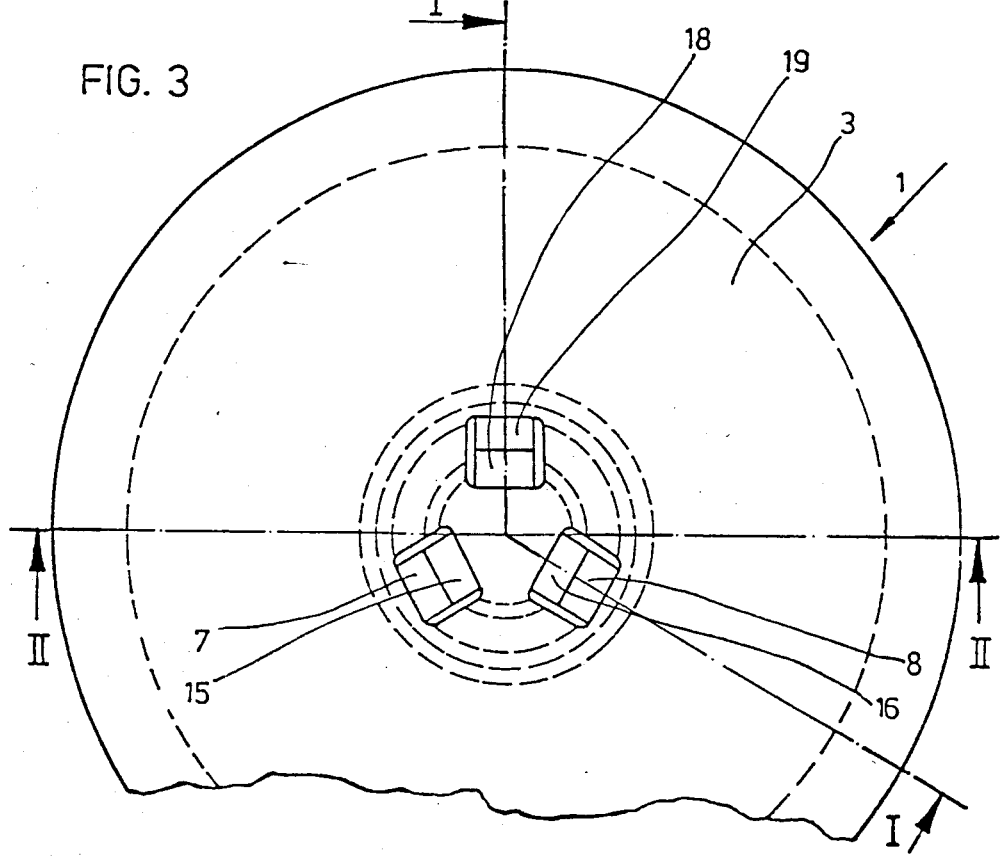

4,579,493

PUSH BUTTON FOR CHRISTMAS TREE STUD

BACKGROUND OF THE INVENTION

The present invention relates to a push button to be pressed onto a stud, in particular a weld stud, which is provided with ridges extending radially outwardly, which push button is provided with a hole enlargeable by the ridges for accommodating the stud.

A push button of this type is disclosed in the German publication DE-OS No. 28 02 465. The known push button is designed similar to a flange nut, the bore of which is provided with three radial slots lying symmetrically with respect to one another. The remaining sections of the bore alongside the slots are of a smooth finish. Due to the slots, the flange nut which is made of plastic has a certain flexibility, which enables the nut to expand when being pressed onto a stud, by which action, the bore is opened out.

Furthermore, German publication DE-OS No. 27 44 294 discloses a plastic anchoring element for trim strips or the like, which comprises a long basic body for clipping a trim strip thereupon and an opening, into which four resilient fingers extend inwardly at an angle. The resilient fingers serve to establish a position behind the head of the T-stud, which is secured onto a base plate, for example the body of a motor vehicle. For mounting the anchoring element, the latter is placed with its opening over the head of the T-stud, which upon applying pressure onto the anchoring element forces the resilient fingers sidewardly until they engage behind the head of the T-stud, and thus lock the latter in position.

Further, attention is also to be directed to German publication DE-Utility Model No. 79 25 469, in which there is disclosed a weld stud provided with ridges extending radially around it, which run around the shank of the weld stud, like a screw thread.

The primary objective of the invention is to develop a push button, which is appropriately designed for pressing onto a stud provided with the aforementioned ridges, in which the forces to be exerted for pressing the push button on are kept low without appreciably deteriorating the pull-off forces, in that a dangerous situation could exist if, by pressing too hard on the push button, the stud would tend to pass through the push button, which might cause injuries.

SUMMARY OF THE INVENTION

According to the invention the problem is solved by providing at least one resilient finger protruding and generally radially angularly from the wall of a blind hole formed in the shank of the button which button is pushable onto a stud. The resilient finger protrudes at such an angle towards the center of the blind hole, that the end face of the resilient finger is able to engage behind a ridge of the stud and that the push button is provided with an opening for each resilient finger, which opening extends from outside towards the locality of the end face of the resilient finger and eclipses the radial cross-section of the resilient finger. That is to say, the cross-sectional area of the resilient finger when projected onto the plane of the opening would be eclipsed or covered by the opening.

By employing a blind hole inside the shank, the shank is provided with a dead-end, which cannot be penetrated by the stud. With the push button mounted on the stud, the stud is thus kept captive permanently inside the blind hole to a certain degree. The mounting is facilitated in that there is provided at least one resilient finger protruding at an angle towards the center of the blind hole, which is able to engage its end face behind a ridge of the stud. When mounting the push button onto a stud, the resilient finger affords little resistance to being displaced by the stud entering the blind hole, which results in relatively little force being required for pressing the push button onto the stud. The resilient finger is able, however, to engage behind a ridge of the stud, which makes removal of the push button in the axial direction practically impossible. In order to produce the resilient fingers in an easy manner (particularly by molding), in view of the existence of the blind hole or the blocked-off condition of the hole, the push button is provided with an opening for each resilient finger, which opening extends from outside the push button towards the region of the end face of the resilient finger and extends over an area at least equal to the radial cross-sectional area of the resilient finger to eclipse the area of the finger as described above. The resilient finger can thereby be formed without difficulty, since a respective mold part can be entered through the opening for forming the area of the end face of the resilient finger.

In the case of a push button being designed with the shank blending into its flange, the opening is appropriately arranged, in that it extends axially from the outer surface of the flange. It is however, also possible to have the opening extending radially from the outer surface of the shank, towards the center of the hole.

BRIEF DESCRIPTION OF THE DRAWING

Preferred embodiments of the invention are illustrated in the accompanying drawing, wherein:

FIG. 2 is a cross-sectional view showing the push button of FIG. 1 without the stud and rotated through 180°;

FIG. 3 is a top view of the push button of FIG. 1 looking downwardly on the flange.

DESCRIPTION OF THE PREFERRED EMBODIMENTS

Figure 1:
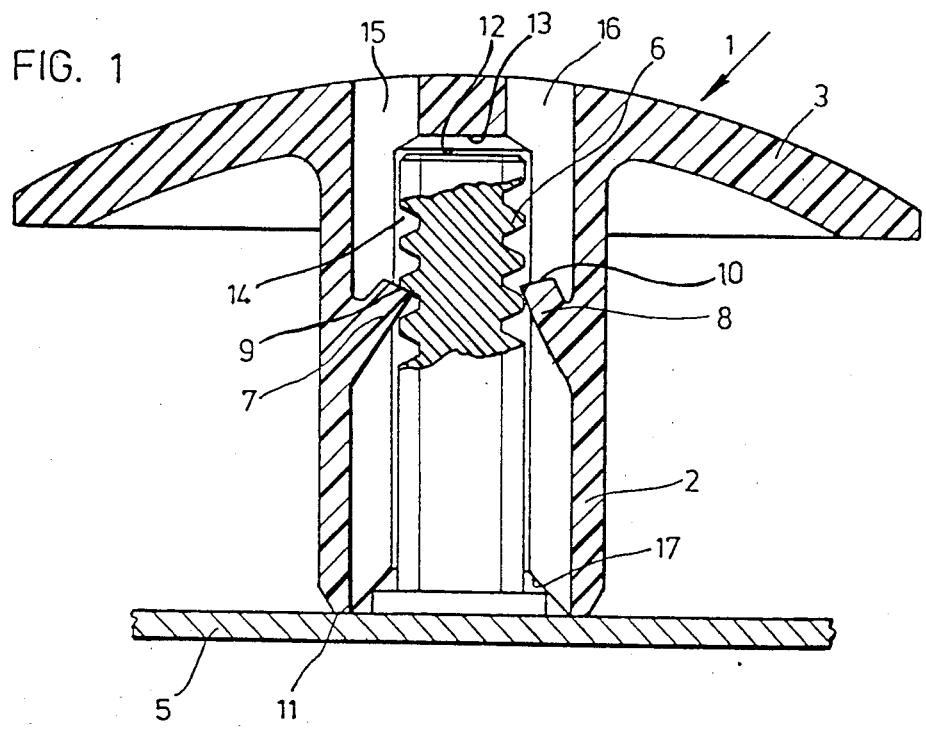
FIG. 1 is a cross-sectional view taken along the line I—I of FIG. 3 showing a push button comprising a shank and a flange, which button is shown pressed onto a stud having radially extending ridges.

The push button 1, as illustrated in FIG. 1, comprises a shank 2 and a flange 3 blending into the shank. The shank 2 is pressed onto a weld stud 4, which is welded to a base 5 in a manner well known in the art. The base 5 could, for instance, be a component of a car body. The weld stud 4 is provided with ridges 6, which encircle the stud similar to a screw thread. Such a weld stud is disclosed in German publication DE-Utility Model No. 79 25 469 referred to above.

A pair of resilient fingers 7 and 8, extend towards the flange 3 at an angle relative to the center of the shank 2, such that they can assume a position behind the ridge 6, by means of their end faces 9 and 10, whereby at least one resilient finger 7 or 8, which happens to be in that particular vertical position at the time, will engage behind the ridge 6, when the push button 1 is mounted onto the weld stud 4. When the push button is being mounted, the resilient fingers 7 and 8 ride over the ridge 6, each at a higher vertical position which is dictated by the particular thread employed. The resilient finger 7 and 8 due to their inherent flexibility are pushed towards the shank 2, until finally, the end-position shown in FIG. 1 is attained, in which either the shank 2 has its forward end located against the base 5, or the front end 12 of the weld stud 4 has come into contact with the inside wall 13 of the flange 3.

In order to give the resilient fingers 7 and 8 the required flexibility, the push button 1 is molded of a plastic material, which ensures an adequate elasticity. The two resilient fingers 7 and 8 make it impossible for the push button 1 to be pulled axially from the weld stud 4. Should the need arise to disassemble the push button 1, then this is accomplished by unscrewing the push button off the weld stud 4.

As can be seen from the drawing, the shank 2 is provided with a blind hole 14, which is formed by the flange 3 closing off the interior of the shank 2. The term "blind hole" as used herein with reference to hole 14 is meant to describe a hole having but one opening capable of entry or exit of the weld stud 4, as shown in the Drawing Figures, however having openings of smaller dimension in accordance with the invention. Thus, the closing off the blind hole by the flange 3 ensures that should the push button 1 be pressed onto the weld stud 4 by the finger, the weld stud 4 cannot pass through the flange 3 should the weld stud 4 be of a corresponding length, which could result in injury to the assembler.

The flange 3 is provided with axially extending openings 15 and 16, which extend from the outer surface of the flange 3 towards the resilient fingers 7 and 8, and are of a cross-section at least as great as the radial cross-section of the resilient fingers 7 and 8 to thereby eclipse the cross-sectional area of the flanges as previously described. By employing this arrangement adequate space is achieved for suitable forms to be entered through the openings 15 and 16 to give the resilient fingers 7 and 8 their corresponding shape.

The shank 2 is provided at its open end with an inwardly-tapering bevel 17 in order to facilitate entry of the weld stud 4 into the shank 2.

In FIG. 2 is shown the push button 1 of FIG. 1, but in a cross-sectional view taken along the line II—II of FIG. 3.

FIG. 3 shows the top view of the same push button 1, looking on top of the flange 3, showing the three axially-extending openings 15, 16 and 18, which provide a view of the three resilient fingers 7, 8 and 19. From this view will to be concluded, that the push button 1 is provided with three resilient fingers 7, 8 and 19 each one being offset by 120°, to which are assigned the three openings 15, 16 and 18. However due to the different view being presented in the drawing, in FIG. 2, of the three resilient fingers, only the resilient finger 7 is visible; while in FIG. 1 only the two resilient fingers 7 and 8 are shown.

Figure 4:
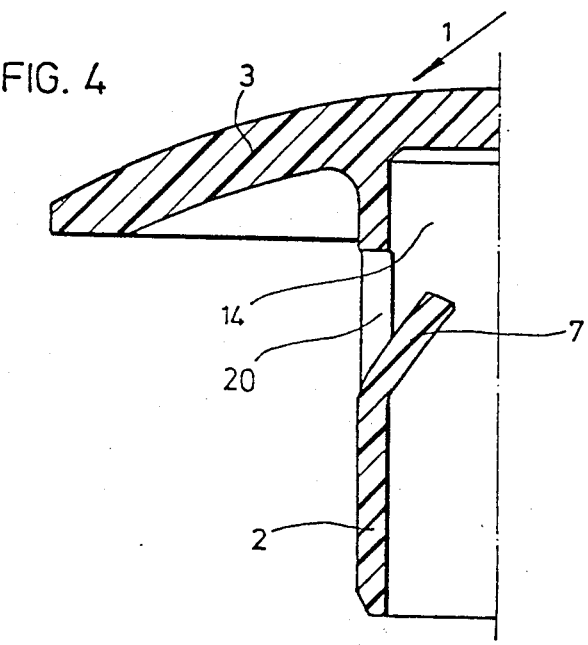
FIG. 4 is a partial sectional view of a push button similar to the one shown in FIG. 1 but having a radial opening provided for each resilient finger.

In FIG. 4 there is shown an alternate embodiment of the push button 1, of which only one half is depicted in a cross-section view similar to the cross-sectional view of FIG. 1, in which the opening provided each resilient finger is merely arranged differently. Herein, the opening 20 provided for the resilient finger 7 is formed in the shank 2. It extends radially from the outer surface of the shank 2 inwardly such that when molding the push button 1, a forming tool can extend through the opening 20 (which serves to form the opening 20) while this forming tool then forms the respective side of the resilient finger 7.

I claim:

1. A unitary push button of a molded flexible plastic material adapted for pressing onto a stud provided with ridges extending generally radially therefrom wherein the button is provided with an opening for accommodating the stud and expandable by said ridges when said button is mounted on said stud, said button comprising a shank having a hole formed axially therethrough, a flange disposed at one end of said shank and blending into said shank, said flange partially closing off said hole at said one end of said shank and said hole being open at the opposite end of said shank, a plurality of resilient fingers protruding radially from the wall of said hole at a predetermined angle toward the center of said hole and having an end face for engagement behind a ridge on the stud and an opening formed through said flange for each of said fingers said openings extending axially from the outer surface of said flange into said hole and being of an area to at least cover the cross-sectional area of a said finger projected in a direction toward said opening.

2. The push button of claim 1 wherein said resilient fingers are three in number, equally spaced about the periphery of said opening.

* * * * *